(12) United States Patent
Nakajima

(10) Patent No.: US 6,366,975 B1
(45) Date of Patent: Apr. 2, 2002

(54) LARGE-SCALE INTEGRATED CIRCUIT (LSI) CIRCUIT FOR CONTROLLING ELECTRONIC DEVICE INCLUDING LSI, AND METHOD OF CONTROLLING THE CIRCUIT

(75) Inventor: Toshikazu Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,579

(22) Filed: Feb. 26, 1999

(30) Foreign Application Priority Data

Feb. 27, 1998 (JP) .......................................... 10-047808

(51) Int. Cl.[7] .............................................. G06F 13/00
(52) U.S. Cl. ...................................... 710/305; 713/323
(58) Field of Search ........................... 712/43; 710/100, 710/126, 129, 130, 131, 107, 260, 261; 713/323

(56) References Cited

U.S. PATENT DOCUMENTS 5,467,435 A * 11/1995 Douglas et al. ............ 358/1.15

FOREIGN PATENT DOCUMENTS

| JP | 60-168180 | 8/1985 |
|----|-----------|--------|
| JP | 62-271021 | 11/1987 |
| JP | 1-319847 | 12/1989 |
| JP | 2-64742 | 3/1990 |
| JP | 9-69070 | 3/1997 |

* cited by examiner

Primary Examiner—Glenn A. Auve
(74) Attorney, Agent, or Firm—Scully, Scott, Murphy & Presser

(57) ABSTRACT

There is provided an integrated circuit electrically connected to both a central processing unit and a memory, for controlling an electronic device, the integrated circuit including (a) a peripheral functional block operating under an operation mode the central processing unit indicated, (b) a communicator for communicating an internal signal to the peripheral functional block, (c) at least two registers capable of being initialized with a desired initial value stored in the memory in accordance with indications from the central processing unit, and (d) a switch receiving an external signal to select one of the registers, a signal being transmitted to the communicator through the thus selected register. The integrated circuit makes it no longer necessary to initialize registers when an operation mode is switched, unlike a conventional integrated circuit.

28 Claims, 7 Drawing Sheets

LARGE-SCALE INTEGRATED CIRCUIT (LSI) CIRCUIT FOR CONTROLLING ELECTRONIC DEVICE INCLUDING LSI, AND METHOD OF CONTROLLING THE CIRCUIT

BACKGROUND OF THE INVENTION

1. Field of the Invention

The invention relates to a large-scale integrated circuit (LSI), and more particularly to a circuit for controlling LSI and an electronic device, including an internal circuit capable of swiftly switching systems operating under different modes.

2. Description of the Related Art

When systems having different modes are to be alternately operated by means of a conventional circuit for controlling an electronic device including LSIs having the same structure, it is necessary to initialize LSIs each time a system is switched to another.

FIGS. 1 is a circuit diagram of a conventional circuit for controlling an electronic device including LSIs. The illustrated circuit is comprised of a central processing unit (CPU) 704, a memory 705, a plurality of LSIs 701$i$ (i=a,b, - - - ), a bus 702 electrically connecting CPU 704 and the memory 705 to LSIs 701$i$. Each of LSIs 701 i is comprised of a register 706$i$ (i=a,b, - - - ) connected to the bus 702, a peripheral functional block 703$i$ (i=a,b, - - - ), and a communicator 710$i$ (i=a,b, - - - ) electrically connected to the register 706$i$ the bus 702, and the peripheral functional block 703$i$.

The memory 705 stores initial values necessary for carrying out each mode. When CPU 704 receives a signal requesting a mode to be switched, CPU 704 transfers an initial value necessary for carrying out a requested mode to the registers 706i from the memory 705. Further, CPU 704 transmits a command signal to the peripheral functional blocks 703$i$ through the communicators 710$i$ to thereby cause the peripheral functional blocks 703$i$ to carry out the requested mode.

However, the conventional circuit illustrated in FIG. 1 is accompanied with the following problems:

(a) a content of each of the registers 706 is eliminated each time when a mode is switched;

(b) it is necessary to make access to the memory 705 for reading out the initial values each time when a mode is to be switched;

(c) it is also necessary to control the bus 702 for reading out the initial values;

(d) a software has to bear a load for controlling the bus 702; and (e) it would take much time for switching a mode because of the abovementioned matters.

For instance, Japanese Unexamined Patent Publication No. 6-168180 having been published for public inspection on Jun. 14, 1994 has suggested a semiconductor integrated circuit including a register and being capable of operating in a plurality of modes. The semiconductor integrated circuit is designed to transfer from a first mode to a second mode when predetermined data is set in the register. In an embodiment, the semiconductor integrated circuit is designed to include a plurality of registers, wherein predetermined data is set in a certain register, only the register is reset.

The suggested semiconductor integrated circuit is also accompanied with the above-mentioned problems.

SUMMARY OF THE INVENTION

In view of the above-mentioned problems in the conventional circuit, it is an object of the present invention to provide a circuit for controlling an electronic device, which circuit is not required to initialize registers when a mode is to be switched, and thereby can shorten a period of time necessary for switching a mode. It is also an object of the present invention to provide a method of controlling the above-mentioned circuit.

In one aspect of the invention, there is provided an integrated circuit electrically connected to both a central processing unit and a memory, for controlling an electronic device, the integrated circuit including (a) a peripheral functional block operating under an operation mode the central processing unit indicated, (b) a communicator for communicating an internal signal to the peripheral functional block, (c) at least two registers capable of being initialized with a desired initial value stored in the memory in accordance with indications from the central processing unit, and (d) a switch receiving an external signal to select one of the registers, a signal being transmitted to the communicator through the thus selected register.

The number of the registers may be set equal to two or three.

There is further provided a circuit for controlling an electronic device, including (a) a central processing unit, (b) a memory storing initial values each associated with each of operation modes, (c) at least one integrated circuit, (d) a detecting circuit for detecting an external mode-switching signal, an operation mode under which the integrated circuit operates being switched by the external mode-switching signal, and (e) a bus electrically connecting the central processing unit to the integrated circuit and the detecting circuit, the integrated circuit including (c1) a peripheral functional block operating under an operation mode the central processing unit indicated, (c2) a communicator for communicating an internal signal to the peripheral functional block, (c3) at least two registers capable of being initialized with a desired initial value stored in the memory in accordance with indications from the central processing unit, and (c4) a switch receiving a selection signal transmitted from the detecting circuit to thereby select one of the registers, a signal being transmitted to the communicator through the thus selected register.

It is preferable that the circuit may further include a recording medium storing therein a program for operating the circuit.

It is preferable that the circuit may further include a signal circuit positioned between the central processing unit and the detecting circuit for keeping the switch inactive even if the switch receives the selection signal transmitted from the detecting circuit. As an alternative, the circuit may further include a signal line electrically connecting the central processing unit to the detecting circuit, the detecting circuit receiving the external mode-switching signal when a signal transmitted from the central processing unit to the detecting circuit through the signal line has a first level, whereas the detecting circuit not receiving the external mode-switching signal when a signal transmitted from the central processing unit to the detecting circuit through the signal line has a second level.

In another aspect of the invention, there is provided a method of controlling a circuit to be used for controlling an electronic device, the circuit including a central processing unit, and at least one integrated circuit electrically connected to the central processing unit, the integrated circuit including at least two registers, a peripheral functional block operating under an operation mode the central processing unit indicated, and a communicator for communicating an internal signal to the peripheral functional block, the method including the steps of (a) initializing each of the registers into a desired mode, (b) selecting one of the registers in accordance with an external mode-switching signal, a signal being transmitted to the communicator through the thus selected register, (c) operating the peripheral functional block under a mode associated with the mode-switching signal, (d) when the mode-switching signal is switched to a new mode-switching signal, switching a register among the registers in accordance with the new mode-switching signal, and (e) operating the peripheral functional block under a mode associated with the new mode-switching signal.

It is preferable that the method further includes the step of keeping the steps (d) and (e) away from being carried out. As an alternative, the method may further include the steps (d) and (e) are carried out when the central processing unit transmits a signal having a first level, and the steps (d) and (e) are not carried out when the central processing unit transmits a signal having a second level.

In still another aspect of the invention, there is provided a recording medium readable by a computer, storing a program therein for causing a computer to act as the above-mentioned control circuit for controlling an electronic device.

There is further provided a recording medium readable by a computer, storing a program therein for causing a computer to carry out the above-mentioned method.

In accordance with the present invention, the integrated circuit for controlling an electronic device includes at least two registers, and receives an external signal to thereby select one of the registers, which is to be used. Thus, a content of the selected register can be effectively used in an internal circuit. Hence, the present invention reduces a load acting on a software, and makes it possible to shorten a total period of time necessary for switching a mode, including a period of time necessary for switching a register, when systems having the same structure, but operating in different modes are to be alternately operated.

For instance, it is now presumed that a control terminal of a switch is in a high level, and a content of a first register is now valid. If the control terminal receives a signal having a low level, a software for operating the circuit is carried out in accordance with a content of a second register. The content of the first register is kept alive, even though the second register is selected for carrying out the software. Hence, if the control terminal receives a signal having the high level, the first register is activated again. That is, it is possible to shortly return back to the previous content by means only of a switching signal which does not pass through a central processing unit.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

[First Embodiment]

Figure 1:
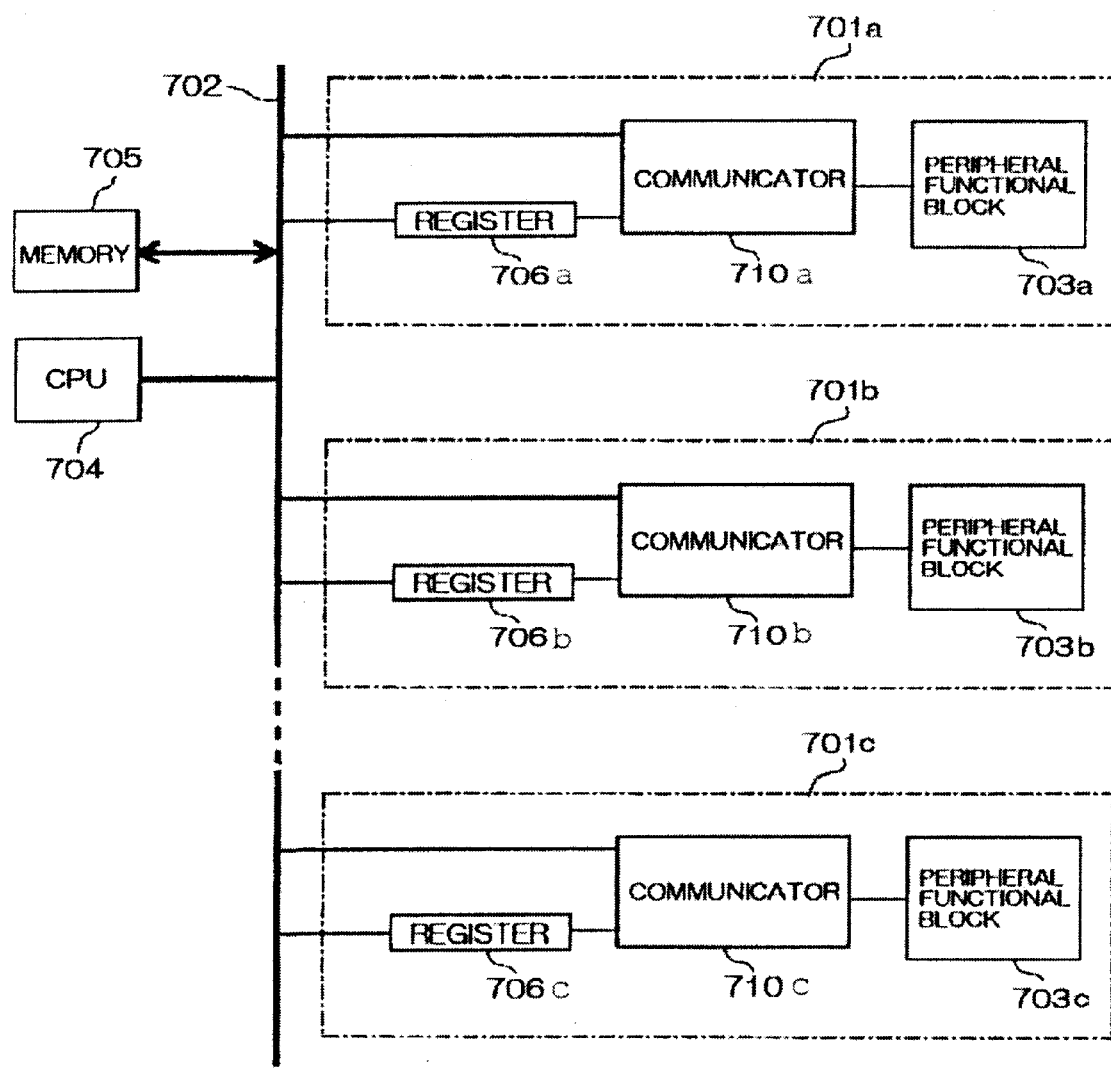
FIG. 1 is a circuit diagram of a conventional circuit with LSI for controlling an electronic device.
Figure 2:
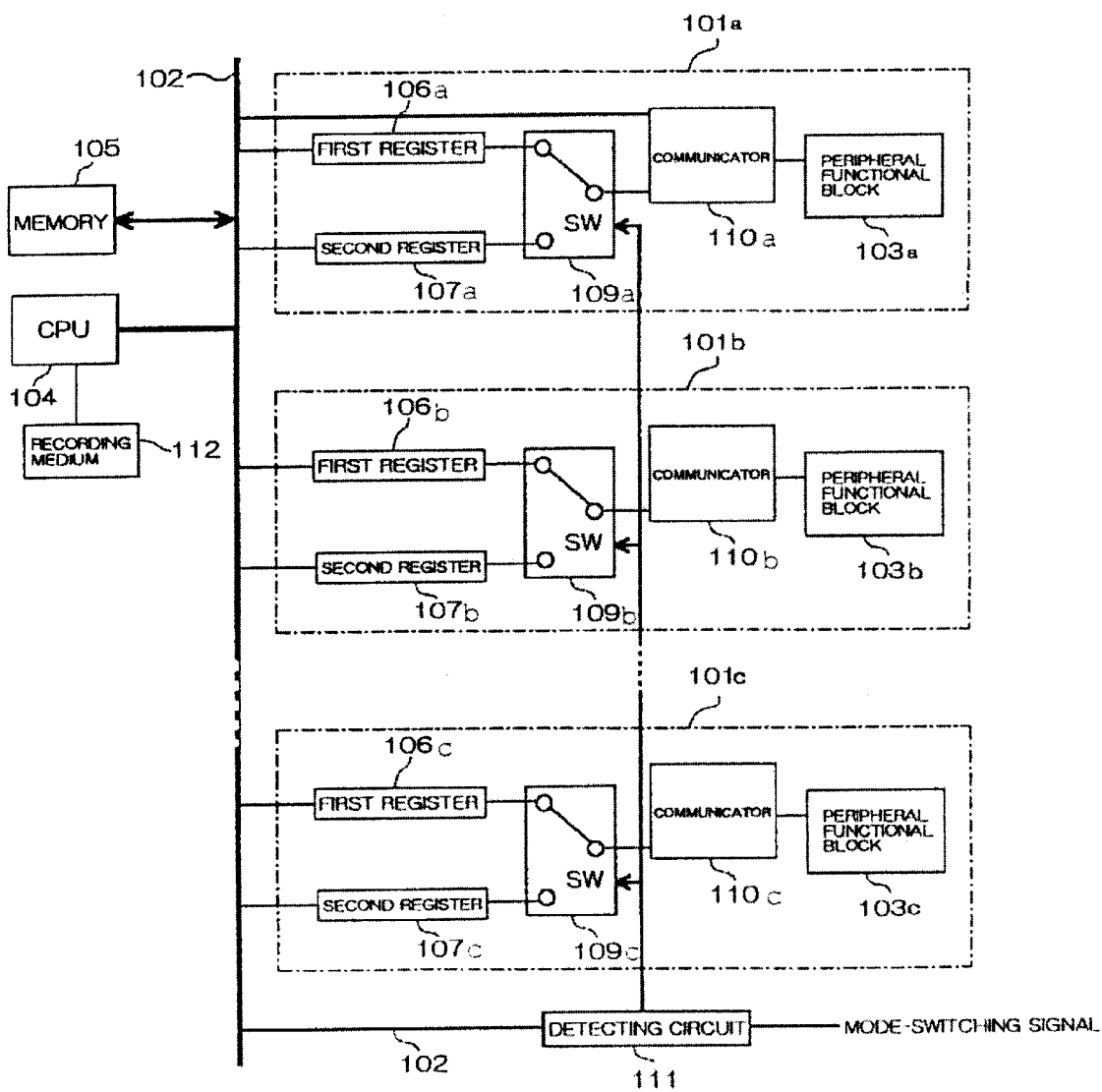
FIG. 2 is a circuit diagram of a circuit with LSI for controlling an electronic device, in accordance with the first embodiment.

FIG. 2 is a circuit diagram illustrating a circuit for controlling an electronic device, in accordance with the first embodiment of the invention.

The illustrated circuit is comprised of a central processing unit (CPU) 104, a memory 105, a recording medium 112 storing a program therein, a plurality of LSIs 101$i$ (i=a, b, c, - - - ), a detecting circuit 111, and a bus 102 electrically connecting CPU 104 and the memory 105 to LSIs 101$i$ and the detecting circuit 111.

Each of LSIs 101$i$ is comprised of a first register 106$i$ (i=a,b,c - - - ) electrically connected to the bus 102, a second register 107$i$ (i=a,b,c, - - - ) electrically connected to the bus 102, a peripheral functional block 103$i$ (i=a,b,c, - - - ), a communicator 110$i$ (i=a,b,c, - - - ) electrically connected both to the bus 102 and the peripheral functional block 103$i$, and a switch 109$i$ (i=a,b,c, - - - ) selecting one of the first and second registers 106$i$ and 107$i$ in accordance with a mode-switching signal transmitted from the detecting circuit 111, and electrically connecting "" the thus selected register 106$i$ or 107$i$ to the communicator 110$i$ therethrough.

Each of LSIs 101$i$ is electrically connected to both CPU 104 and the memory 105 through the bus 102. CPU 104 transmits data to and receives data from each of the peripheral functional blocks 103$i$ through the communicator 110 in each of the LSIs 101$i$. Each of the peripheral functional blocks 103$i$ is designed to operate under different modes by varying a program used for operation of the peripheral functional blocks 103$i$. In the first embodiment, each of the peripheral functional blocks 103$i$ is designed to operate in different modes 1 and 2. Programs and data associated with the modes 1 and 2 are stored in the memory 105. The recording medium 112 stores therein a program for controlling the circuit.

The detecting circuit 111 receives an external signal indicating that a register is to be switched. The external signal has a high or low logic level. On receipt of the external signal, the detection circuit 111 transmits the mode-switching signal to the switch 109$i$. The switch 109$i$ selects one of the first and second registers 106$i$ and 107$i$ in accordance with the mode-switching signal. The thus selected register 106$i$ and 107$i$ transmits an output signal to the communicator 110$i$ through the switch 109$i$.

For instance, the detecting signal 111 transmits a first mode-switching signal for selecting the first register 106$i$, when the received external signal has a high level, whereas the detecting signal 111 transmits a second mode-switching signal for selecting the second register 107$i$, when the received external signal has a low level.

The detecting circuit 111 also transmits a signal indicative the level of the received external signal to CPU 104. The communicator 110$i$ is comprised of a buffer, an I/O selector and so on, and controls transmission of data therethrough.

Figure 3:
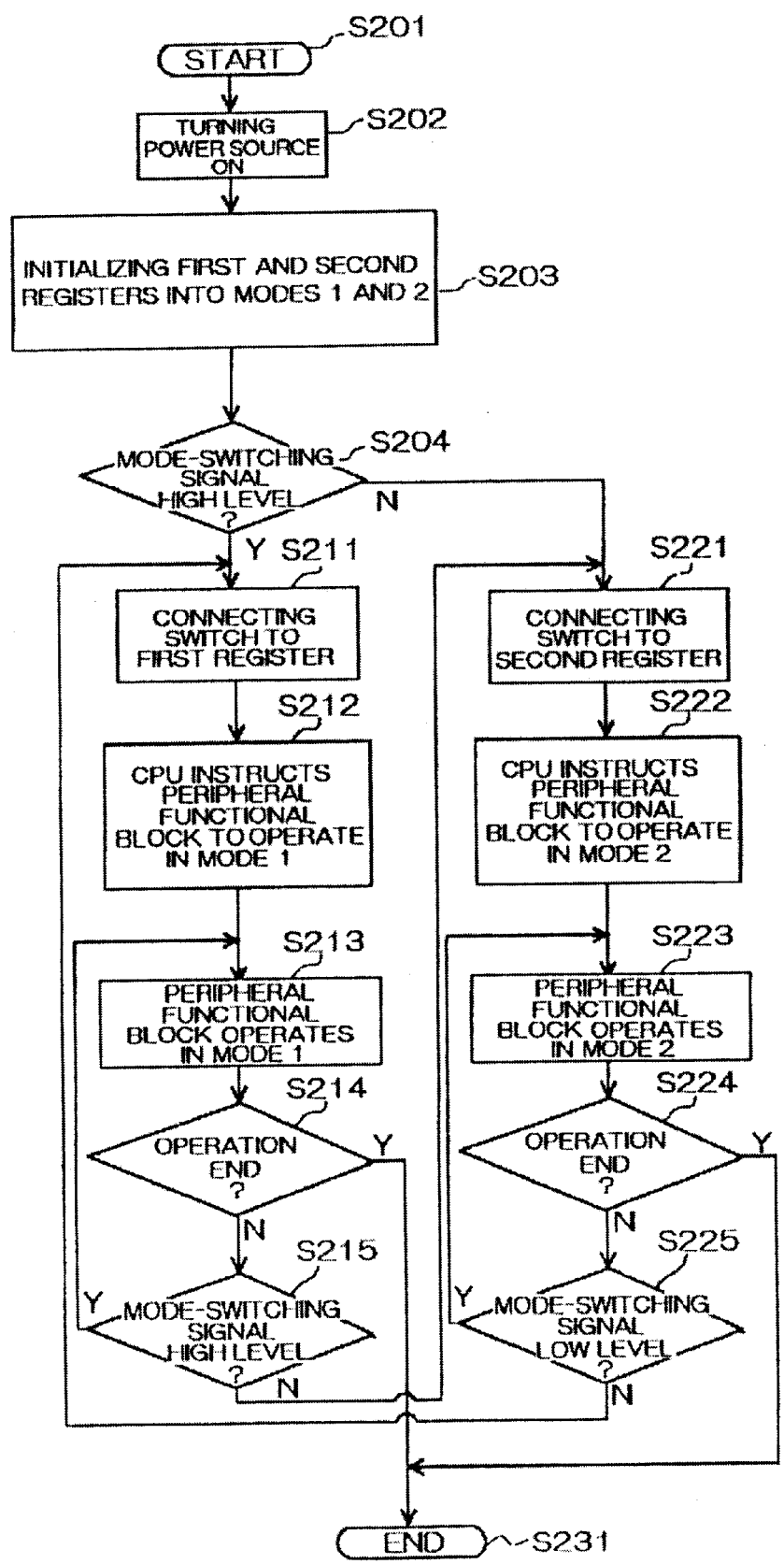
FIG. 3 is a flow chart of the circuit illustrated in FIG. 2.

FIG. 3 is a flow chart of the circuit illustrated in FIG. 2. hereinbelow is explained an operation of the circuit illustrated in FIG. 2. The first and second registers 106$i$ and 107$i$ are associated with the modes 1 and 2, respectively.

At start in step 201, a power source is turned on in step 202. Then, CPU 104 writes initial values for the modes 1 and 2 into the first and second registers 106i and 107i, respectively, which initial values are read out of the memory 105, in step 203.

The detecting circuit 111 detects a level of a received mode-switching signal. If the mode-switching signal is in high level (YES in step 204), the detecting circuit 111 transmits a first switching signal to the switches 109i to thereby connect the first registers 106i to the communicators 110i through the switches 109i in step 211. If the mode-switching signal is in low level (NO in step 204), the detecting circuit 111 transmits a second switching signal to the switches 109i to thereby connect the second registers 107i to the communicators 110i through the switches 109i in step 221.

When the mode-switching signal is in high level (YES in step 204), the detecting circuit 111 further transmits a signal to CPU 104 by interruption or through the register, which signal indicates that the mode-switching signal is in a high level. Then, CPU 104 transmits a signal indicative of the mode 1 to the peripheral functional blocks 103a, 103b, 103c, - - - through the communicators 110i, in step 212. On receipt of the signal from CPU 104, the peripheral functional blocks 103a, 103b, 103c, - - - carry out an operation under the mode 1, in step 213.

Then, the detecting circuit 111 confirms whether a signal is transmitted indicating that the operation should be finished, in step 214. If the detecting circuit 111 receives such a signal (YES in step 214), the detecting circuit 111 finishes the operation of the circuit, in step 231.

If the detecting circuit 111 does not receive the signal (NO in step 214, the detecting circuit 111 confirms whether the mode-switching signal has a high level. If the mode-switching signal has a low level (YES in step 225), the step 223 and the subsequent steps are repeated. If the mode-switching signal has a high level (NO in step 225), the detecting circuit 111 transmits a second switching signal to the switches 109i to thereby connect the first registers 106i to the communicators 110i through the switches 109i, in step 211. Thereafter, the peripheral functional blocks 103a, 103b, 103c, - - - are caused to operate under the above-mentioned mode 1.

When the mode-switching signal is in a low level (NO in step 215), the detecting circuit 111 further transmits a signal to CPU 104 by interruption or through the register, which signal indicates that the mode-switching signal has a low level. Then, CPU 104 transmits a signal indicative of the mode 2 to the peripheral functional blocks 103a, 103b, 103c, - - - through the communicators 110i, in step 222. On receipt of the signal from CPU 104, the peripheral functional blocks 103a, 103b, 103c, - - - carry out an operation under the mode 2, in step 223.

Then, the detecting circuit 111 confirms whether a signal is transmitted indicating that the operation should be finished, in step 224. If the detecting circuit 111 receives such a signal (YES in step 224), the detecting circuit 111 finishes the operation of the circuit, in step 231.

If the detecting circuit 111 does not receive the signal (NO in step 224), the detecting circuit 111 confirms whether the mode-switching signal has a low level. If the mode-switching signal has a low level (YES in step 225), the step 223 and the subsequent steps are repeated. If the mode-switching signal has a high level (NO in step 225), the detecting circuit 111 transmits a second switching signal to the switches 109i to thereby connect the first registers 106i to the communicators 110i through the switches 109i, in step 211. Thereafter, the peripheral functional blocks 103a, 103b, 103c, - - - are caused to operate under the above-mentioned mode 1.

A control program is read out of the recording medium 112 to CPU 104, and controls the operation of the circuit illustrated in FIG. 2, through CPU 104. CPU 104 carries out the following operation in accordance with the read-out control program.

First, the first and second registers 106i and 107i are initialized each in a predetermined mode stored in the memory 105. Then, the switches 109i are connected to either the first register 106i or the second register 107i in accordance with an external switching signal. Thus, the selected register 106i or 107i transmits an output signal to the peripheral functional blocks 103a, 103b, 103c, - - - through the communicators 110i.

Then, the peripheral functional blocks 103a, 103b, 103c, are caused to carry out an operation in a mode associated with the switched switching signal.

If the switching signal is switched, the switches 109i are connected to either the first register 106i or the second register 107i in accordance with the switched external switching signal. Thus, the selected register 106i or 107i transmits an output signal to the peripheral functional blocks 103a, 103b, 103c, - - - through the communicators 110i.

Then, the peripheral functional blocks 103a, 103b, 103c, - - - are caused to carry out an operation in a mode associated with the switched switching signal.

[Second Embodiment]

Figure 4:
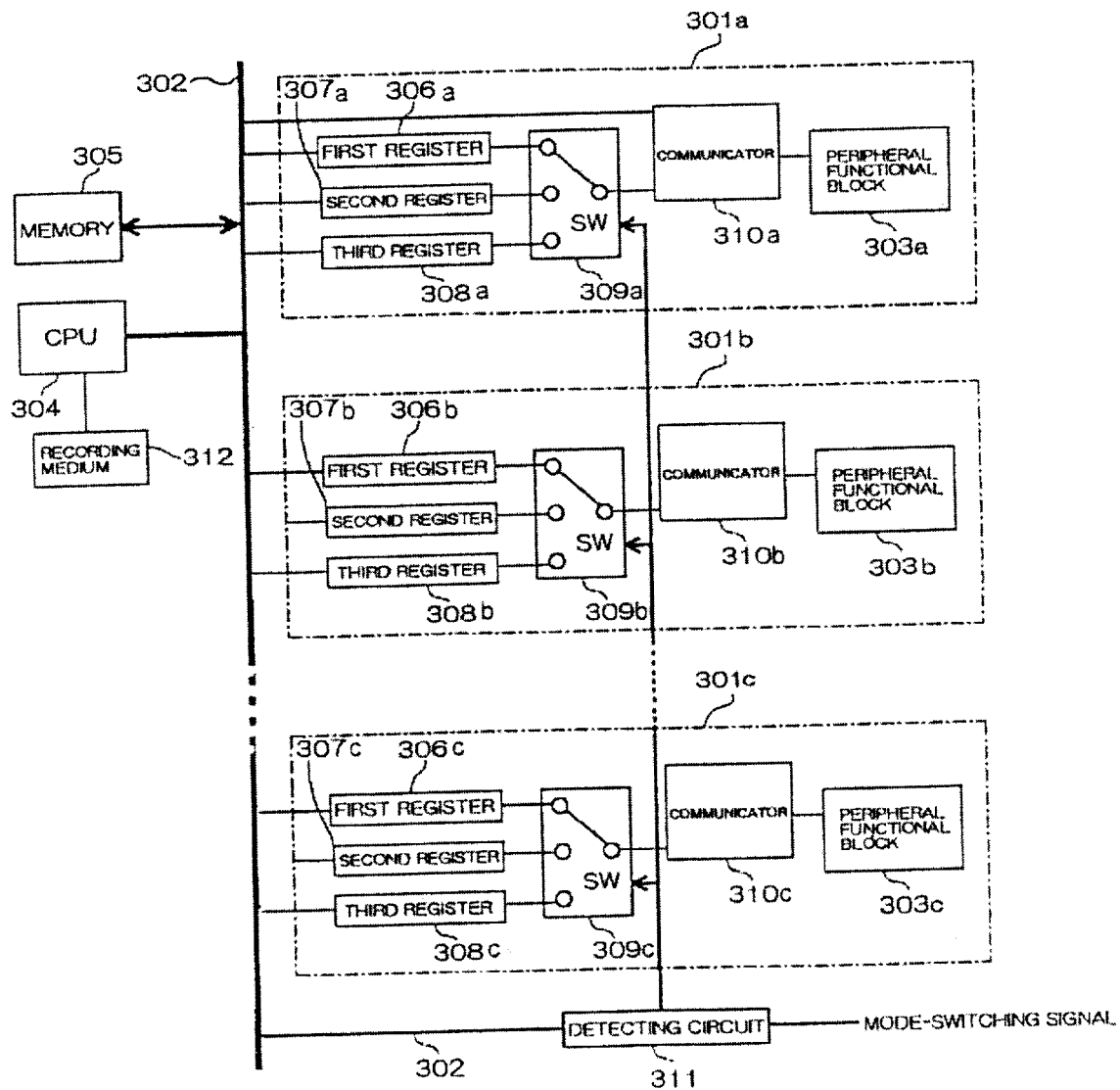
FIG. 4 is a circuit diagram of a circuit with LSI for controlling an electronic device, in accordance with the second embodiment.

FIG. 4 is a circuit diagram illustrating a circuit for controlling an electronic device, in accordance with the second embodiment of the invention.

The illustrated circuit is comprised of a central processing unit (CPU) 304, a memory 305, a recording medium 312 storing a program therein, a plurality of LSIs 301i (i=a, b, c, - - - ), a detecting circuit 311, and a bus 302 electrically connecting CPU 304 and the memory 305 to LSIs 301i and the detecting circuit 311.

Each of LSIs 301i is comprised of a first register 306 (i=a, b, c, - - - ) electrically connected to the bus 302, a second register 307 (i=a, b, c, - - - ) electrically connected to the bus 302, a third register 308 (i=a, b, c, - - - ) electrically connected to the bus 302, a peripheral functional block 303i (i=a, b, c, - - - ), a communicator 310 (i=a, b, c, - - - ), electrically connected both to the bus 302 and the peripheral functional block 303i, and a switch 309 (i=a, b, c, - - - ) selecting one of the first to third registers 306i to 308i in accordance with a mode-switching signal transmitted from the detecting circuit 311, and electrically connecting the thus selected register 306i, 307i 308i the communicator 310i therethrough.

The circuit in accordance with the second embodiment is different in structure from the circuit in accordance with the first embodiment is different in structure from the circuit in accordance with the first embodiment in having the three registers 306i, 307i, and 308i one of which is electrically connected to the communicator 310i through the switch 309i. The first second and third registers 306i, 307i, and 308i are associated with modes 1, 2, and 3, respectively.

The detecting circuit 311 transmits a mode-switching signal having a high, middle, or low level. Specifically, when the detecting circuit 311 transmits a high level mode-switching signal to the switch 109i, the switch 309i electrically connects the first register 306i to the communicator 310i. When the detecting circuit 311 transmits a middle level mode-switching to the switch 109i, the switch 309i electrically connects the second register 307i to the communicator 310i. When the detecting circuit 311 transmits a low level mode-switching signal to the switch 1 09i, the switch 309i electrically connects the third register 308i to the communicator 310i.

The circuit in accordance with the second embodiment is designed to have the same structure as that of the first embodiment except the above-mentioned structural difference.

For instance, the high, middle, or low level mode-switching signal may be comprised of a 2-bit logic signal such as (1-1), (1-0), and (0-0), respectively.

Figure 5:
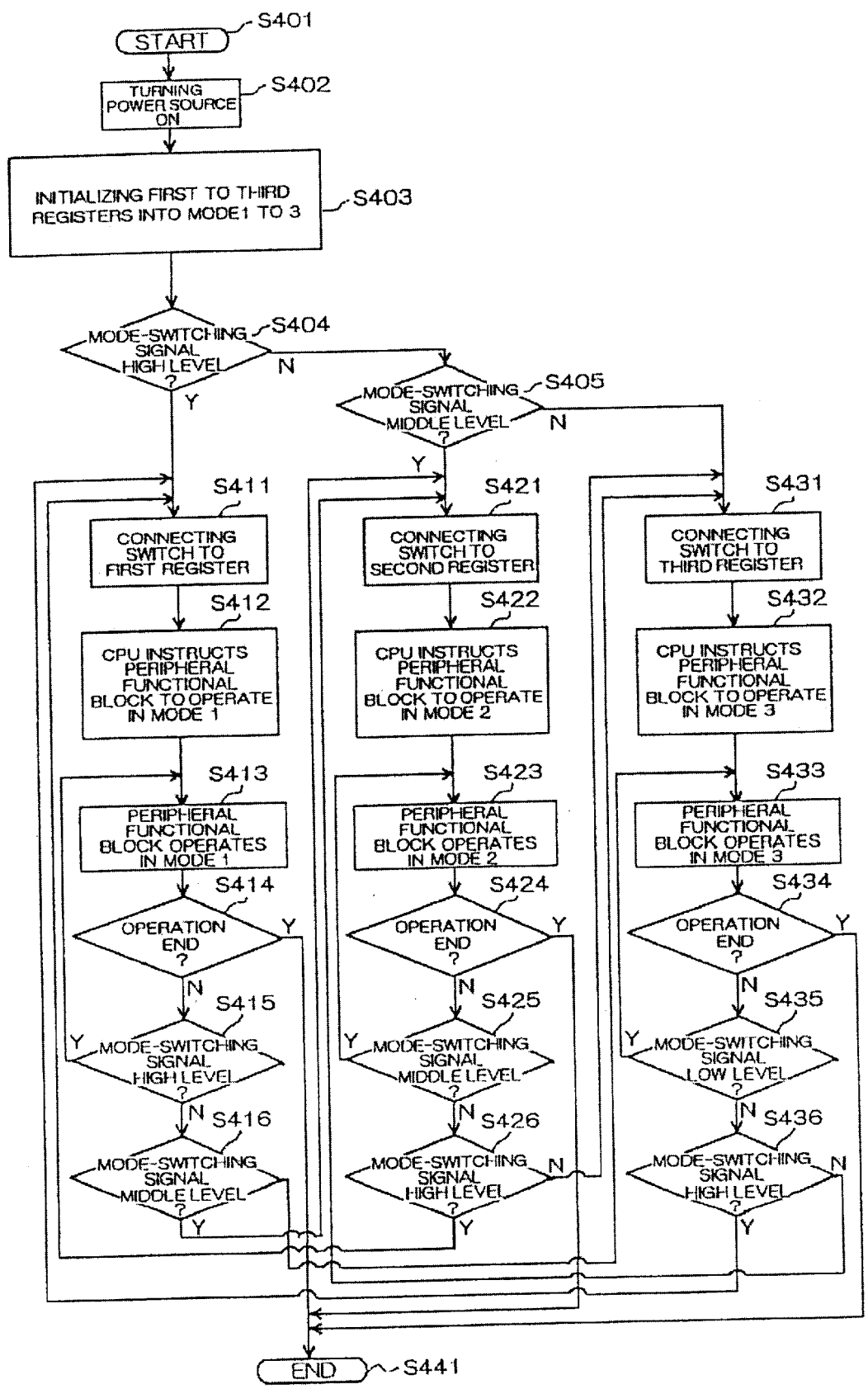
FIG. 5 is a flow chart of the circuit illustrated in FIG. 4.

FIG. 5 is a flow chart of the circuit illustrated in FIG. 4. The first, second and third registers 306i, 307i, and 308i are associated with the modes 1, 2, and 3 respectively.

At start in step 401, a power source is turned on in step 402. Then, CPU 304 writes initial values for the modes 1 to 3 into the first, second and third registers 306i, 307i and 308i, respectively, which initial values are read out of the memory 305, in step 403.

The detecting circuit 311 detects a level of a received mode-switching signal. If the mode-switching signal has a high level (YES in step 404), the detecting circuit 311 transmits a first switching signal to the switches 309i to thereby connect the first registers 306i to the communicators 310i through the switches 309i in step 411. If the mode-switching signal does not have a high level (NO in step 404), the detecting circuit 311 detects whether the mode-switching signal has a middle or low level. If the mode-switching signal has a middle level (YES in step 405), the detecting circuit 311 transmits a second switching signal to the switches 309i to thereby connect the second registers 307i to the communicators 310i through the switches 309i in step 421. If the mode-switching signal does not have a middle level, or if the mode-switching signal has a low level (NO in step 405), the detecting circuit 311 transmits a third switching signal to the switches 309i to thereby connect the third registers 308i to the communicators 310i through the switches 309i in step 431.

When the mode-switching signal has a high level (YES in step 404), the detecting circuit 311 further transmits a signal to CPUI 304 by interruption or through the register, which signal indicates that the mode-switching signal has a high level. Then, CPU 304 transmits a signal indicative of the mode 1 to the peripheral functional blocks 303a, 303b, 303c, - - - through the communicators 310i, in step 412. On receipt of the signal transmitted from CPU 304, the peripheral functional blocks 303a, 303b,303c, - - - carry out an operation under the mode 1, in step 413.

Then, the detecting circuit 311 confirms whether a signal is transmitted indicating that the operation should be finished, in step 414. If the detecting circuit 311 receives such a signal (YES in step 414), the detecting circuit 311 finishes the operation of the circuit, in step 441.

If the detecting circuit 311 does not receive the signal (NO in step 414), the detecting circuit 311 confirms whether the mode-switching signal has a high level. If the mode-switching signal has a high level (YES in step 415), the step 413 and the subsequent steps are repeated. If the mode-switching signal does not have a high level, the detecting circuit 311 confirms whether the mode-switching signal middle a high level. If the mode-switching signal has a middle level (YES in step 416), the step 421 and the subsequent steps are repeated. If the mode-switching signal does not have a middle level (NO in step 416), the step 431 is carried out.

In step 421 (YES in step 405, YES in step 416, or NO in step 436), the detecting circuit 311 transmits a second switching signal to the switches 309i - - - to thereby connect the second registers 307i to the communicators 310i through the switches 309i. The detecting circuit 311 further transmits a signal to CPU 304 by interruption or through the second registers 307i, which signal indicates that the mode-switching signal has a middle level. Then, CPU 304 transmits a signal indicative of the mode 2 to the peripheral functional blocks 303a, 303b, 303c, - - - through the communicators 310i, in step 422. On receipt of the signal from CPU 304, the peripheral functional blocks 303a, 303b, 303c, carry out an operation under the mode 2, in step 423.

Then, the detecting circuit 311 confirms whether a signal is transmitted indicating that the operation should be finished, in step 424. If the detecting circuit 311 receives such a signal (YES in step 424), the detecting circuit 311 finishes the operation of the circuit, in step 441. If the detecting circuit 311 does not receive the signal (NO in step 424), the detecting circuit 311 confirms whether the mode-switching signal has a middle level. If the mode-switching signal has a middle level (YES in step 425), the step 423 and the subsequent steps are repeated. If the mode-switching signal does not have a middle level (NO in step 425), the detecting circuit 311 confirms whether the mode-switching signal has a high level. If the mode-switching signal has a high level (YES in step 426), the steps 411 and the subsequent steps are carried out. If the mode-switching signal does not have a high level (NO in step 426), that is, if the mode-switching signal has a low level, the step 431 and the subsequent steps are repeated.

In step 431 (NO in step 405, No in step 416, or No in step 426), the detecting circuit 311 transmits a third switching signal to the switches 309i to thereby connect the third registers 308i to the communicators 310i through the switches 309i. The detecting circuit 311 further transmits a signal to CPU 304 by interruption or through the third registers 308i, which signal indicates that the mode-switching signal has a low level. Then, CPU 304 transmits a signal indicative of the mode 3 to the peripheral functional blocks 303a, 303b, 303c, - - - through the communicators 310i, in step 432. On receipt of the signal from CPU 304, the peripheral functional blocks 303a, 303b, 303c, - - - carry out an operation under the mode 3, in step 433.

Then, the detecting circuit 311 confirms whether a signal is transmitted indicating that the operation should be finished, in step 434. If the detecting circuit 311 receives such a signal (YES in step 434), the detecting circuit 311 finishes the operation of the circuit, in step 441. If the detecting circuit 311 does not receive the signal (NO in step 434), the detecting circuit 311 confirms whether the mode-switching signal has a low level. If the mode-switching signal has a low level (YES in step 435), the step 433 and the subsequent steps are repeated. If the mode-switching signal does not have a low level (NO in step 435), the detecting circuit 311 confirms whether the mode-switching signal has a high level. If the mode-switching signal has a high level (YES in step 436), the steps 411 and the subsequent steps are carried out. If the mode-switching signal does not have a high level (NO in step 436), that is, if the mode-switching signal has a middle level, the step 421 and the subsequent steps are repeated.

The number of the registers is not to be limited to two in the first embodiment and three in the second embodiment. It should be noted that each of LSIs may be designed to include four or more registers.

[Third Embodiment]

Figure 6:
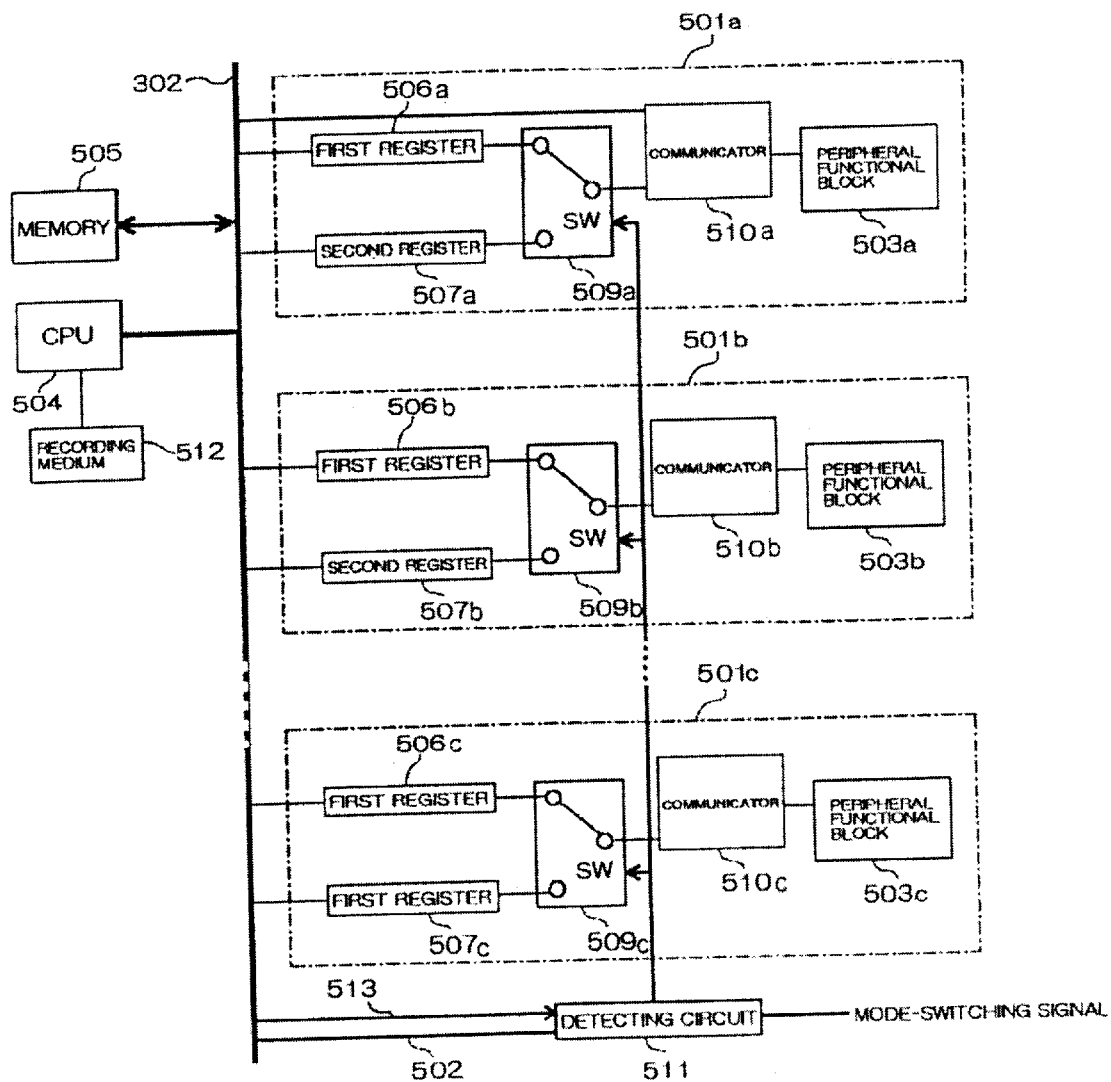
FIG. 6 is a circuit diagram of a circuit with LSI for controlling an electronic device, in accordance with the third embodiment.

FIG. 6 is a circuit diagram illustrating a circuit for controlling an electronic device, in accordance with the third embodiment of the invention.

The illustrated circuit is comprised of a central processing unit (CPU) 504, a memory 505, a recording medium 512 storing a program therein, a plurality of LSIs 501$i$ (i=a, b, c, - - - ), a detecting circuit 511, a bus 502 electrically connecting CPU 504 and the memory 505 to LSIs 501$i$ and the detecting circuit 511, and a signal line 513 electrically connecting the bus 502 to the detecting circuit 511.

Each of LSIs 501$i$ is comprised of a first register 506 (i=a, b, c, - - - ) electrically connected to the bus 502, a second register 507 (i=a, b, c, - - - ) electrically connected to the bus 502, a peripheral functional; block 503$i$ (i=a, b, c, - - - ), a communicator 510 (i=a, b, c, - - - ) electrically connected both to the bus 502 and the peripheral functional block 503$i$, and a switch 509 (i=a, b, c, - - - ) selecting one of the first and second registers 506$i$ and 507$i$ in accordance with a mode-switching signal transmitted from the detecting circuit 511, and electrically connecting the thus selected register 506$i$ or 507$i$ to the communicator 510$i$ therethrough.

Thus, the circuit in accordance with the third embodiment is structurally different from the first embodiment in that the signal line 513 is added.

When a signal having a high level is transmitted from CPU 504 to the detecting circuit 511 through the signal line 513, the detecting circuit 511 is allowed to receive an external mode-switching signal. On the other hand, when a signal having a low level is transmitted from CPU 504 to the detecting circuit 511 through the signal line 513, the detecting circuit 511 is not allowed to receive an external mode-switching signal.

When a sequence now being carried out is not to be interrupted, CPU 504 transmits a signal having a low level to the detecting circuit 511 through the signal line 513. In some applications, a register cannot be switched into another one for transferring to a different mode, unless a sequence has been ended. The circuit in accordance with the third embodiment can operate with such applications.

In the above-mentioned third embodiment, the signal line 513 may be replaced with a signal circuit (not illustrated). The signal circuit is positioned between the bus 502 and the detecting circuit 511, and is designed to keep the switches 509$i$ inactive, even if the detecting circuit 511 receives the mode-switching signal.

Figure 7:
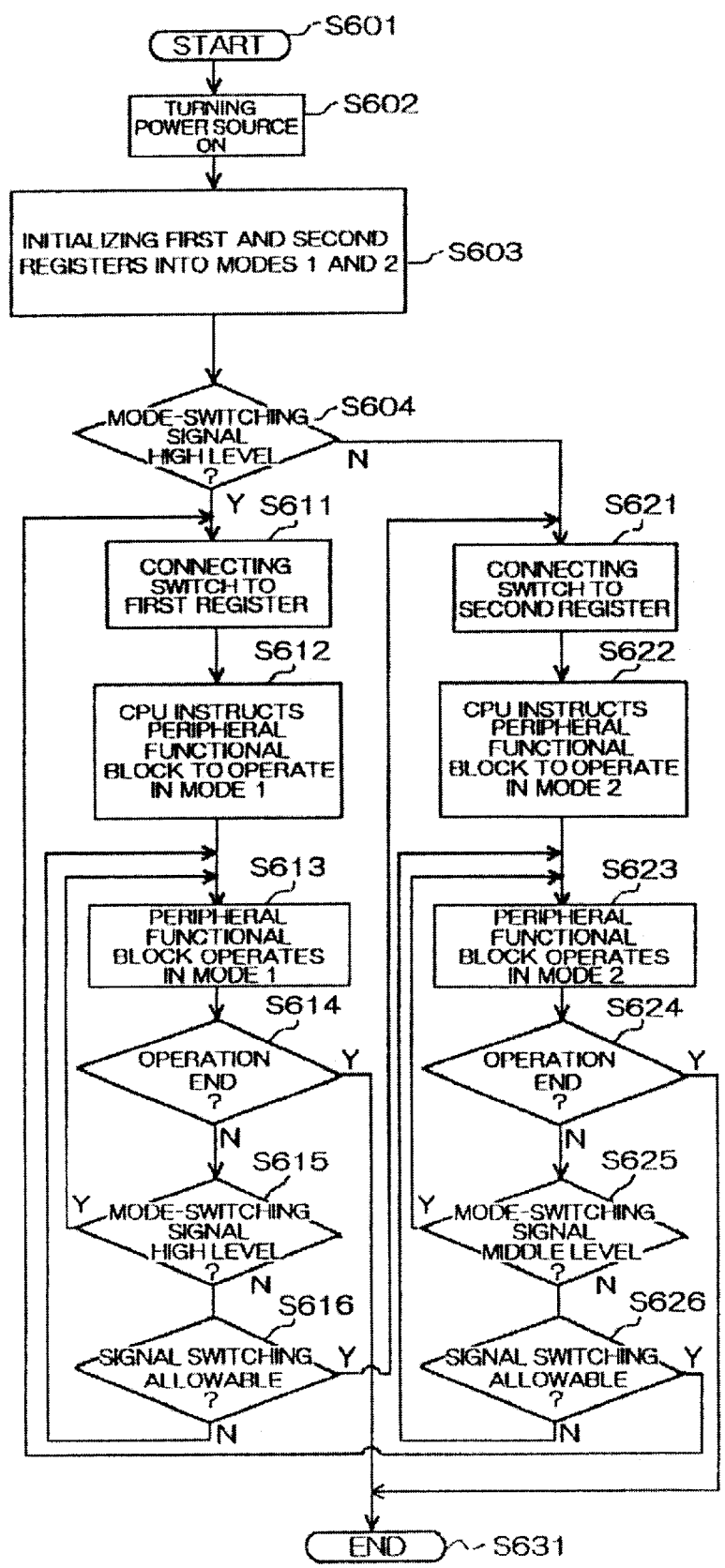
FIG. 7 is a flow chart of the circuit illustrated in FIG. 6.

FIG. 7 is a flow chart of the circuit illustrated in FIG. 6. Hereinbelow is explained an operation of the circuit illustrated in FIG. 6. Steps 601 to 604, steps 611 to 615, and steps 621 to 625 in FIG. 7 are the same as the steps 201 to 204, the steps 211 to 215, and the steps 221 to 225 in FIG. 3, respectively, and hence, are not explained hereinbelow.

If the mode-switching signal does not have a high level in step 615, step 621 and subsequent steps are carried out only when the registers 506$i$ and 507$i$ are allowed to be switched, that is, when a signal transmitted through the signal line 513 has a high level (YES in step 616). When the registers 506$i$ and 507$i$ are not allowed to be switched, that is, when a signal transmitted through the signal line 513 has a low level (NO in step 616), step 613 and subsequent steps are carried out again to thereby continue the mode 1.

Similarly, if the mode-switching signal does not have a low level in step 625, step 611 and subsequent steps are carried out only when the registers 506$i$ and 507$i$ are allowed to be switched, that is, when a signal transmitted through the signal line 513 has a high level (YES in step 626). When the registers 506$i$ and 507$i$ are not allowed to be switched, that is, when a signal transmitted through the signal line 513 has a low level (NO in step 626), step 623 and subsequent steps are carried out to thereby continue the mode 2.

The circuit in accordance with the third embodiment provides an advantage that an operator can switch a mode-switching signal without paying an attention to system condition.

Through each of LSIs 501$i$ is designed to include the two registers 506$i$ and 507$i$ in FIG. 6, it should be noted that the third embodiment may be applied to a circuit where each of LSIs is designed to include three of more registers.

Hereinbelow is explained an embodiment of a recording medium storing a program therein for accomplishing the above-mentioned circuit as illustrated in FIGS. 2, 4, and 6.

A recording medium storing a program for accomplishing the abovementioned circuit may be accomplished by programming functions of the abovementioned circuit with a programming language readable by a computer, and recording the program in a recording medium such as CD-ROM, a floppy disc, a magnetic tape, and any other suitable means for storing a program therein.

As a recording medium may be employed a hard disc equipped in a server. It is also possible to accomplish the recording medium in accordance with the present invention by storing the above-mentioned computer program in such a recording medium as mentioned above, and reading the computer program by other computers through a network.

While the present invention has been described in connection with the embodiments, the present invention provides two major advantages.

First, the present invention makes it possible to swiftly switch systems. This is because each of LSIs is designed to include a plurality of registers, and also because the registers can be switched directly by an external switching signal. A content which the register retained just before a mode has been switched is kept alive, even though the register is switched. Accordingly, it is no longer necessary to transfer initial values, which are different for modes, into a register from a memory each time when a mode is switched.

Secondly, it is possible to reduce a load exerting on a software. This is because, since the number of access to a memory is reduced, traffic in a bus is reduced in a period of time until a next mode starts with the result of reduction in processing time.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-47808 filed on Feb. 27, 1998 including specification, claims, drawings and summary is incorporated herein by reference in its entirety.

What is claimed is:

1. An integrated circuit electrically connected to both a central processing unit and a memory, for controlling an electronic device, said integrated circuit comprising:

(a) a peripheral functional block operating under an operation mode said central processing unit indicated;

(b) a communicator for communicating an internal signal to said peripheral functional block;

(c) at least two registers capable of being initialized with a desired initial value stored in said memory in accordance with indications from said central processing unit; and (d) a switch receiving an external signal to select one of said registers, a signal being transmitted to said communicator through the thus selected register.

2. The integrated circuit as set forth in claim 1, wherein the number of said registers is two.

3. The integrated circuit as set forth in claim 1, wherein the number of said registers is three.

4. A circuit for controlling an electronic device, comprising:
   (a) a central processing unit;
   (b) a memory storing initial values, each initial value associated with one of a plurality of operation modes;
   (c) at least one integrated circuit;
   (d) detecting circuit for detecting an external mode-switching signal, an operation mode under which said integrated circuit operates being switched by said external mode-switched by said external mode-switching signals; and
   (e) a bus electrically connecting said central processing unit to said integrated circuit and said detecting circuit, said integrated circuit comprising:
      (c1) a peripheral functional block operating under an operation mode said central processing unit indicated;
      (c2) a communicator for communicating an internal signal to said peripheral functional block;
      (c3) at least two registers capable of being initialized with a desired initial value stored in said memory in accordance with indication from said central processing unit; and
      (c4) a switch receiving a selection signal transmitted from said detecting circuit to thereby select one of said registers, a signal being transmitted to said communicator through the thus selected register.

5. The circuit as set forth in claim 4, further comprising a recording medium storing therein a program for operating said circuit.

6. The circuit as set forth in claim 4, further comprising a signal circuit positioned between said central processing unit and said detecting circuit for keeping said switch inactive even if said switch receives said selection signal transmitted from said detecting circuit.

7. The circuit as set forth in claim 4, further comprising a signal line electrically connecting said central processing unit to said detecting circuit, said detecting circuit receiving said external mode-switching signal when a signal transmitted from said central processing unit to said detecting circuit through said signal line has a first level, whereas said detecting circuit not receiving said external mode-switching signal when a signal transmitted from said central processing unit to said detecting circuit through said signal line has a second level.

8. The circuit as set forth in claim 4, wherein the number of said registers is two.

9. The circuit as set forth in claim 4, wherein the number of said registers is three.

10. A method of controlling a circuit to be used for controlling an electronic device, said circuit including a central processing unit, and at least one integrated circuit electrically connected to said central processing unit, said integrated circuit including at least two registers, a peripheral functional block operating under an operation mode said central processing unit indicated, and a communicator for communicating an internal signal to said peripheral functional block, said method comprising the steps of:
   (a) initializing each of said registers into a desired mode;
   (b) selecting one of said registers in accordance with an external mode-switching signal, a signal being transmitted to said communicator through the thus selected register;
   (c) operating said peripheral functional block under a mode associated with said mode-switching signal;
   (d) when said mode-switching signal is switched to a new mode-switching signal, switching a register among said registers in accordance with said new mode-switching signal; and
   (e) operating said peripheral functional block under a mode associated with said new mode-switching signal.

11. The method as set forth in claim 10, further comprising the step of preventing said steps (d) and (e) from being carried out.

12. The method as set forth in claim 10, wherein said steps (d) and (e) are carried out when said central processing unit transmits a signal having a first level, and said steps (d) and (e) are not carried out when said central processing unit transmits a signal having a second level.

13. The method as set forth in claim 10, wherein the number of said registers is two.

14. The method as set forth in claim 10, wherein the number of said registers is three.

15. A recording medium readable by a computer, storing a program therein for causing a computer to act as a control circuit electrically connected to both a central processing unit and a memory, for controlling an electronic device, said program including computer readable instructions for accomplishing the functions of said control circuit comprising:
   (a) a peripheral functional block operating under an operation mode said central processing unit indicated;
   (b) a communicator for communicating an internal signal to said peripheral functional block;
   (c) at least two registers capable of being initialized with a desired initial value stored in said memory in accordance with indications from said central processing unit; and
   (d) a switch receiving an external signal to select one of said registers, a signal being transmitted to said communicator through the thus selected register.

16. The recording medium as set forth in claim 15, wherein the number of said registers is two.

17. The recording medium as set forth in claim 15, wherein the number of said registers is three.

18. A recording medium readable by a computer, storing a program therein for causing a computer to act as a control circuit electrically connected to both a central processing unit and a memory, for controlling an electronic device, said program including computer readable instructions for accomplishing the functions of said control circuit comprising:
   (a) a central processing unit;
   (b) a memory storing initial values each associated with each of operation modes;
   (c) at least one integrated circuit;
   (d) a detecting circuit for detecting an external mode-switching signal, an operation mode under which said integrated circuit operates being switched by said mode-switching signal; and
   (e) a bus electrically connecting said central processing unit to said integrated circuit and said detecting circuit, said integrated circuit comprising:
      (c1) a peripheral functional block operating under an operation mode said central processing unit indicated;
      (c2) a communicator for communicating an internal signal to said peripheral functional block;
      (c3) at least two registers capable of being initialized with a desired initial value stored in said memory in accordance with indication from said central processing unit; and
      (c4) a switch receiving a selection signal transmitted from said detecting circuit to thereby select one of said registers, a signal being transmitted to said communicator through the thus selected register.

19. The recording medium as set forth in claim 18, wherein said control circuit further includes a recording medium storing therein a program for operating said circuit.

20. The recording medium as set forth in claim 18, wherein said control circuit further includes a signal circuit positioned between said central processing unit and said detecting circuit for keeping said switch inactive even if said switch receives said selection signal transmitted from said detecting circuit.

21. The recording medium as set forth in claim 18, wherein said control circuit further includes a signal line electrically connecting said central processing unit to said detecting circuit, said detecting circuit receiving said external mode-switching signal when a signal transmitted from said central processing unit to said detecting circuit through said signal line has a first level, whereas said detecting circuit not receiving said mode-switching signal from said central processing unit when a signal transmitted from said central processing unit to said detecting circuit through said signal line has a second level.

22. The recording medium as set forth in claim 18, wherein the number of said registers is two.

23. The recording medium as set forth in claim 18, wherein the number of said registers is three.

24. A recording medium readable by a computer, storing a program therein for causing a computer to carry out a method of controlling a circuit to be used for controlling an electronic device, said circuit including a central processing unit, and at least one integrated circuit electrically connected to said central processing unit, said integrated circuit including at least two registers, a peripheral functional block operating under an operation mode said central processing unit indicated, and a communicator for communicating an internal signal to said peripheral functional block, said method comprising the steps of:

(a) initializing each of said registers into a desired mode;

(b) selecting one of said registers in accordance with an external mode-switching signal, a signal being transmitted to said communicator through the thus selected register;

(c) operating said peripheral functional block under a mode associated with said mode-switching signal;

(d) when said mode-switching signal is switched to a new mode-switching signal, switching a register among said registers in accordance with said new mode-switching signal; and (e) operating said peripheral functional block under a mode associated with said new mode-switching signal.

25. The recording medium as set forth in claim 24, said method further includes the step of preventing said steps (d) and (e) from being carried out.

26. The recording medium as set forth in claim 24, wherein said steps (d) and (e) are carried out when said central processing unit transmits a signal having a first level, and said steps (d) and (e) are not carried out when said central processing unit transmits a signal having a second level.

27. The recording medium as set forth in claim 24, wherein the number of said registers is two.

28. The recording medium as set forth in claim 24, wherein the number of said registers is three.

* * * * *